June 4, 1957     R. KLEMM     2,794,907
HURRICANE LAMPS
Filed Aug. 27, 1953

INVENTOR
RUDOLF KLEMM
ATTORNEYS

United States Patent Office 2,794,907
Patented June 4, 1957

2,794,907

HURRICANE LAMPS

Rudolf Klemm, Altena, Westphalia, Germany, assignor to Graetz Kommandit-Gesellschaft, Altena, Germany Application August 27, 1953, Serial No. 376,774

Claims priority, application Germany October 4, 1952

7 Claims. (Cl. 240—50)

The present invention relates to incandescent pressure lamps operated with liquid fuels under the pressure of forced-in air. Such lamps generally consist of a fuel tank, a lower casing part provided with supporting rods being mounted on the latter part, the rods being connected at the top to a support ring. The so-called chimney is mounted on this support ring and is surrounded in turn by the top casing part. The glass cylinder is situated between the chimney and the under casing part.

In hurricane lamps of the above-mentioned kind the under casing is generally provided with apertures, the purpose of these being to allow the access of secondary air to the incandescent element.

The lamps of the known type, it has been found, become very hot, particularly when there is very little fuel left in the tank. This heating up of the fuel container takes place to such an extent that it becomes difficult to operate the air pump and in some cases it cannot be handled at all.

The object of the present invention is to remedy this drawback. It achieves this on account of the fact that the whole of the bottom edge of the lower casing no longer rests as formerly on the fuel tank and only portions of this lower edge come into contact with the tank in question. In this case the customary apertures for the secondary air are dispensed with and the latter is only able to penetrate between the lower edge of the lower casing and the fuel tank.

A number of embodiments of the present invention are illustrated in the accompanying drawing, wherein.

Figure 1:
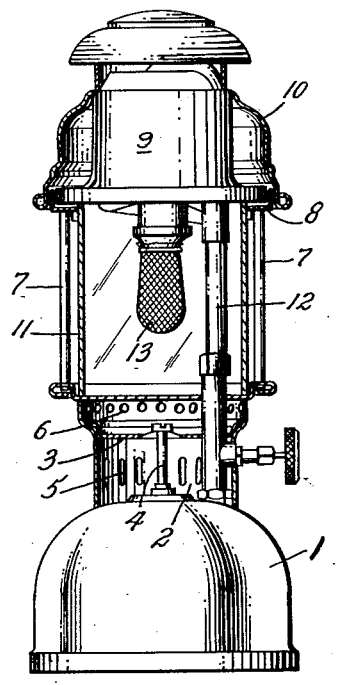
Figure 1 shows an incandescent hurricane lamp of the usual type.

As illustrated in Figure 1, the lower casing part 2 rests on the fuel container or tank 1, being fixed to said tank 1 by means of a centering bottom 3 and a screw 4. The lower casing 2 is provided with slots 5 and holes 6 for supplying secondary air. The lower casing 2 is provided with supporting rods 7 to which is secured the support ring 8. In the latter is located the chimney 9 surrounded by the top casing part 10. Between the chimney 9 and the lower casing part 2 is the glass cylinder 11 inside which can be seen the vaporiser 12 and the incandescent element 13. This represents the ordinary type of construction of a powerful beam hurricane lamp.

Figure 2:
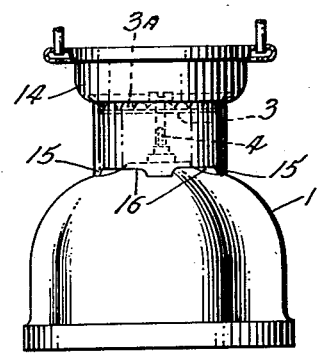
Figure 2 shows a lower casing part provided with recesses on the lower edge according to the present invention.
Figure 3:
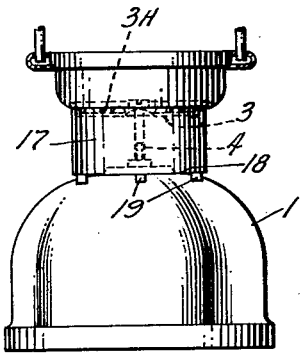
Figure 3 shows a lower casing part provided with a straight bottom edge and distance pieces.
Figure 4:
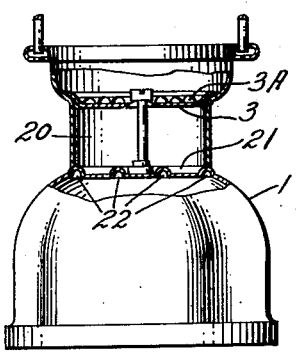
Figure 4 shows a lower casing provided with a straight bottom edge and a fuel tank provided with a number of raised parts on which this edge rests.

Figures 2 to 4 show on the other hand modified forms of the lower casing or the fuel container or tank, in accordance with the present invention.

As illustrated in Figure 2, the lower casing part 14 is fixed to the fuel tank 1 by means of the centering bottom 3 provided with aperture 3A and the screw 4, the bottom edge 15 of the lower casing being provided with a number of recesses 16.

As shown in Figure 3 the lower casing part 17 is secured to the fuel tank 1 by means of the centering bottom 3 and the screw 4, the bottom edge 18 of the lower casing being made straight, a number of plates or distance pieces 19 being provided between the fuel tank 1 and the bottom edge 18, these plates or distance pieces being made of some material which is a bad conductor of heat.

Figure 4 shows a lower casing part 20 provided with a straight bottom edge 21, this lower casing being fixed by means of the centering bottom 3 and the screw 4. In this example, the fuel tank 1 is provided with raised parts 22 on which this straight edge 21 rests.

The working of the hurricane lamp according to the present invention is as follows:

In the usual type of hurricane lamp shown in Figure 1, a part of the heat radiated from the incandescant element 13 passed through the vaporiser 12 by conduction to the fuel container 1. This was however by far the smaller part. The greater part of the radiation heat of the incandescent element 13 passed to the centering bottom 3, the glass cylinder 11 and the edge of the lower casing 2 and so by heat conduction to the fuel tank or container 1. The secondary air penetrating through the air slots 5 and the holes 6 had no cooling action on the fuel container 1.

In the constructional forms according to the present invention no apertures are provided in the lower casing member for the passage of secondary air. The lower casing is only provided in these constructions with an aperture for the eccentric shaft of the hand wheel to pass through, and if necessary, with a further aperture and a constricted part when the hurricane lamp is provided with a so-called quick heater. The essential feature of the incandescent pressure lamp according to the present invention lies in the fact that the secondary air enters between the fuel container and the lower edge of the bottom casing, that is, the lower casing does not rest as formerly with its whole lower surface or edge on the fuel container but only portions of this lower edge touch the container. A number of embodiments are possible according to the present invention, those illustrated in the drawings being merely examples.

The advantage of the incandescent pressure lamp according to the present invention is that the lower casing does not rest with the whole of its lower edge on the fuel container, this edge touching the container only at a few points so that the heat conduction between the lower casing and the fuel container is reduced to a minimum.

The secondary air is also compelled to pass directly through between the fuel container and the bottom edge of the lower casing which also assists the cooling of the surface of the fuel container. It is immaterial which of the constructional forms is selected. The effect is the same in all three embodiments. The main thing is to bring the lower casing into contact with the fuel container only at a few points and to make the air pass through between the fuel container and the lower edge of the bottom casing. The temperatures of the fuel container are much smaller in a lamp constructed in accordance with the present invention than in those of the usual kind and the difficulties hitherto existing on account of the overheating of the fuel container no longer occur.

I claim:

1. In an incandescent lamp of the type operated with liquid fuel under pressure, that improvement which comprises a tank to contain liquid fuel, an upper light emitting assembly, and a casing member having an imperforate side wall joining said tank and said assembly, the juncture between the said casing member and the tank providing circumferentially spaced passages for the admission of secondary air into the assembly with the secondary air passing between the casing member and tank also cooling the tank.

2. In an incandescent lamp of the type operated with liquid fuel under pressure the combination comprising, a light and heat emitting element, means for supporting said element, a tank to contain liquid fuel, and a casing member having an imperforate wall joining said tank and said supporting means, the juncture between the said casing member and the tank providing circumferentially spaced air passages for the admission of secondary air into the element with the secondary air passing between the casing member and the tank also cooling the tank.

3. An incandescent lamp of the type adapted to use liquid fuel under pressure comprising in combination a light and heat emitting element having a vertical axis of symmetry, supporting structure for said element coaxially disposed about said vertical axis, a substantially cylindrical tank coaxially disposed about said axis, and a cylindrical casing member having an imperforate side wall arranged about said axis to join said tank and said supporting structure, the juncture between said casing member and the tank providing circumferentially spaced air passages between said casing member and tank for the admission of secondary air into the element with the secondary air passing between the casing member and the tank also cooling the tank.

4. The lamp as set forth in claim 1 wherein the circumferentially spaced passages are defined by a plurality of spaced apart cut-out portions with the lobes between such cut-out portions engaging the tank and the spaced cut-out portions being formed in the end of the casing member adjacent the tank.

5. The lamp as set forth in claim 1 wherein the circumferentially spaced passages are defined by providing the casing member with a plurality of spaced plates secured to one end thereof and held in sandwiched relation between the said tank and the said casing member.

6. The lamps as set forth in claim 5 wherein the said plates are of a heat insulating material.

7. The lamp as set forth in claim 1 wherein the circumferentially spaced passages are defined by a plurality of spaced raised bosses on the tank with the raised bosses engaging the said casing member.

References Cited in the file of this patent

UNITED STATES PATENTS

| | | |
|---|---|---|
| 520,659 | Rhind | May 29, 1894 |
| 1,266,164 | Ryder | May 14, 1918 |
| 1,415,180 | Kohlhase | May 9, 1922 |

FOREIGN PATENTS

| | | |
|---|---|---|
| 552,828 | Great Britain | Apr. 27, 1943 |